United States Patent
Winter et al.

[11] Patent Number: 5,841,048
[45] Date of Patent: Nov. 24, 1998

[54] MUSICAL WIND INSTRUMENT HAVING STOPS WHICH ARE FULLY MACHINED BEFORE BEING ATTACHED AND A PROCESS FOR PRODUCING IT

[75] Inventors: Michael Winter, Nauheim, Germany; Paul Baronnat, Chantemesle, France

[73] Assignee: Buffet Crampon S.A., La Ville, France

[21] Appl. No.: 836,229

[22] PCT Filed: Sep. 9, 1996

[86] PCT No.: PCT/FR96/01382

§ 371 Date: May 7, 1997

§ 102(e) Date: May 7, 1997

[30] Foreign Application Priority Data

Sep. 8, 1995 [FR] France ................... 95 10528

[51] Int. Cl.⁶ .................................................. G10D 7/00
[52] U.S. Cl. .................................................. 84/380 R
[58] Field of Search .......................... 84/380 R, 382, 84/386

[56] References Cited

U.S. PATENT DOCUMENTS 4,669,351  6/1987  Ono .................................. 84/380 R

FOREIGN PATENT DOCUMENTS 1121158   7/1956   France .
1537339  12/1978   United Kingdom .

Primary Examiner—Renee S. Luebke
Assistant Examiner—Shih-yung Hsieh
Attorney, Agent, or Firm—Stroock & Stroock & Lavan

[57] ABSTRACT

The musical wind instrument comprises a keying stop (7) engaging by means of a base in a hole in the body (2).

The base has a non-circular cross section and the hole is defined by an associated non-circular wall.

6 Claims, 1 Drawing Sheet

MUSICAL WIND INSTRUMENT HAVING STOPS WHICH ARE FULLY MACHINED BEFORE BEING ATTACHED AND A PROCESS FOR PRODUCING IT

Musical wind instruments, notably clarinets, oboes and similar instruments, comprise a body defining a drilled hole. On the outer lateral surface of the body are attached keying stops between which hinges or keys are subsequently mounted.

Hitherto, a metal stop was fixed in the body by a threaded base which was screwed into a tapped hole provided beforehand in the body. After the stop had been fixed to the body, it was machined, in spite of the problems of access of the tools and machines caused by the presence of the body. Although it would have been easier to machine the stop prior to its attachment, this was not possible, because the fact that the stop was being screwed into a body made of relatively soft material, especially wood, plastics or composite material, meant that one could not be certain that the stop was always in the same orientation, as the bores provided in the stops for the attachment of the keys and hinges could not then be aligned.

The invention overcomes this disadvantage with a musical instrument in which the stops can be fully machined before assembly.

According to the invention the base has a non-circular cross section and the hole is defined by an associated non-circular rim.

The cross section comprises, for example, a rectilinear part or two opposing rectilinear parts and the hole is defined by a rectilinear rim or two opposing rectilinear rims, although any other shape is possible, and the cross section of the base may even be in the form of two arcs of circles of different radii.

Lowering the base into the corresponding hole ensures that the stop maintains the desired orientation on account of the flattened areas, corresponding to the rectilinear parts of the cross section, which serve to guide it.

Preferably, the base has a rib perpendicular to the axis of the stop and the hole has a groove associated with the rib. The phrase "axis of the stop" refers to the axis along which it is lowered into the hole during assembly. The level of the stop above the body is thus controlled.

The invention also relates to a method of producing a wind instrument which consists in fixing a keying stop to a body. The process is characterised in that the stop is fully machined before being fitted.

In the accompanying drawings, provided solely by way of example,

Figure 1:
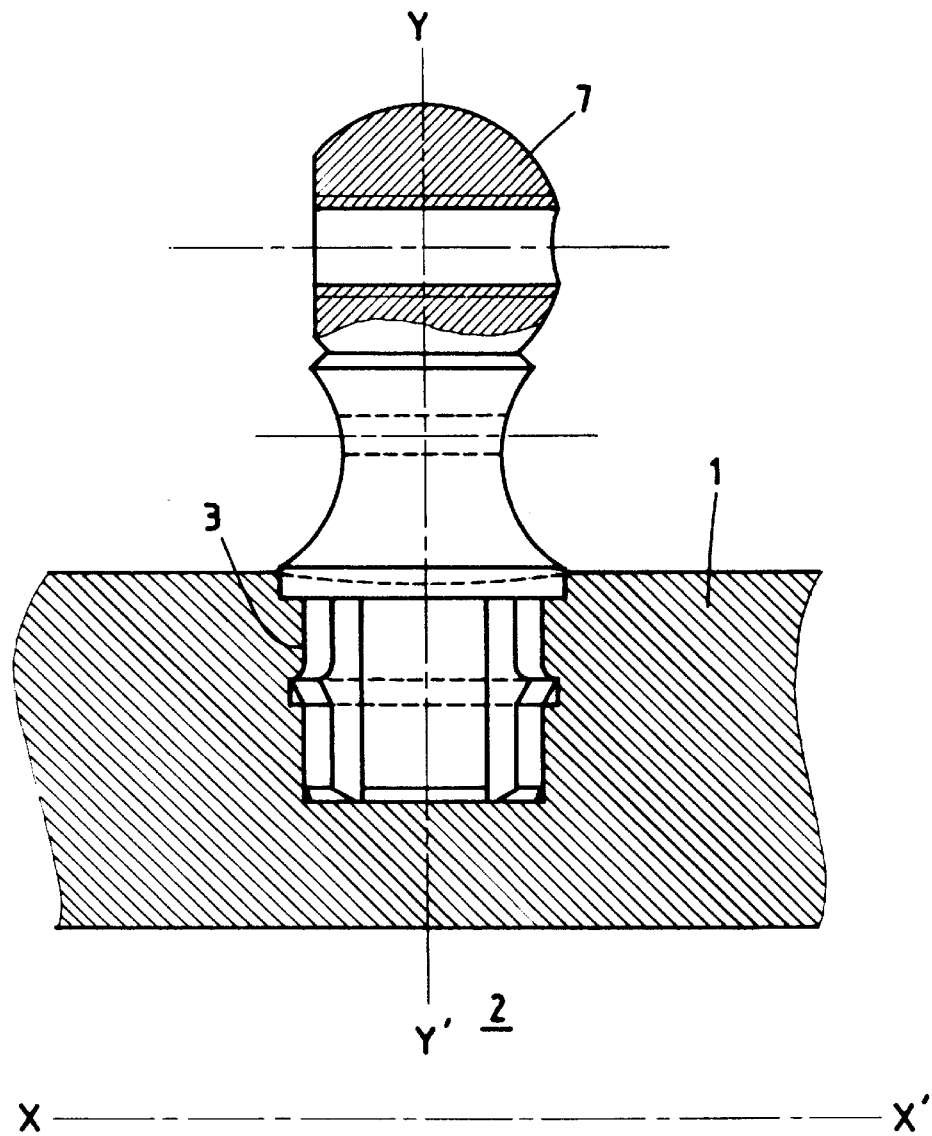
FIG. 1 is a view, partially in section, of a half clarinet.

In FIG. 1, the clarinet has a substantially annular body, of axis X—X', defining a drilled hole 2.

Figure 3:
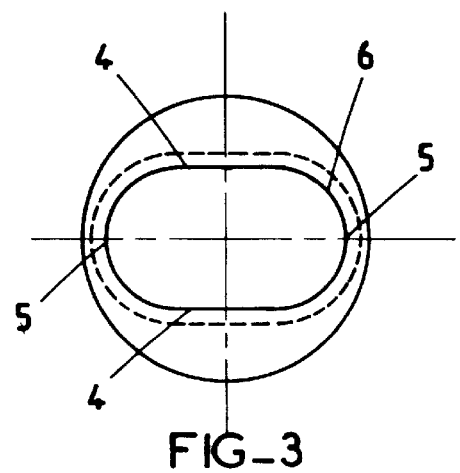
FIG. 3 is a plan view of the hole, when the base of the stop is not engaged therein.

In the body 1 is provided a hole 3 which, as shown in FIG. 3, viewed in cross section, has two opposing rectilinear parts 4 connected to each other by two arcs of a circle 5. A groove 6 is provided all around the hole.

Figure 2:
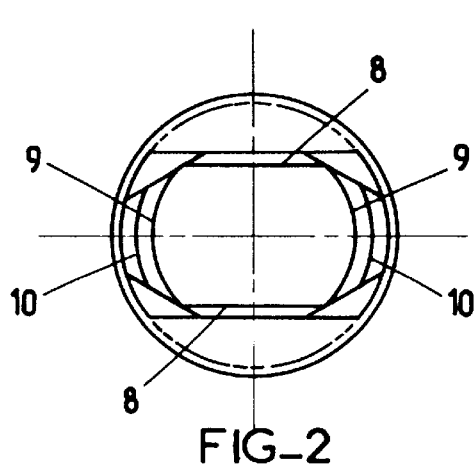
FIG. 2 is a plan view, in the direction of the arrow II in FIG. 1, of the base of the stop.

Force-fitted into the hole 3 is the base of a stop 7 of axis Y—Y'. This base has two opposing flattened areas 8, as can be seen in FIG. 2, linked together by two cylindrical parts 9 on which ribs 10 are formed.

In order to produce the clarinet, first of all the stop 7 is machined completely, then the base 3 is sunk into the hole, so that the flattened areas 8,8 are located facing the rectilinear parts 4 and the ribs 10 penetrate into the groove 6 to hold the stop in its sunken position and thus prevent accidental dismantling.

We claim:

1. Musical wind instrument comprising a body (1) on the lateral outer surface of which is fixed a keying stop (7) engaging by means of a base in a hole in the body, characterised in that the base has a non-circular cross section and the hole is defined by an associated non-circular wall.

2. The instrument according to claim 1, characterized in that the base comprises two opposing flattened areas.

3. The instrument according to claim 2, characterized in that the body is made of wood or another soft material.

4. The instrument according to claim 1, characterized in that the base comprises a rib (10) perpendicular to the axis (Y—Y') of the stop (7) and the hole comprises a groove (6) associated with the rib (10).

5. The instrument according to claim 4, characterized in that the body is made of wood or another soft material.

6. The instrument according to claim 1, characterized in that the body is made of wood or another soft material.

* * * * *